Figure 1:
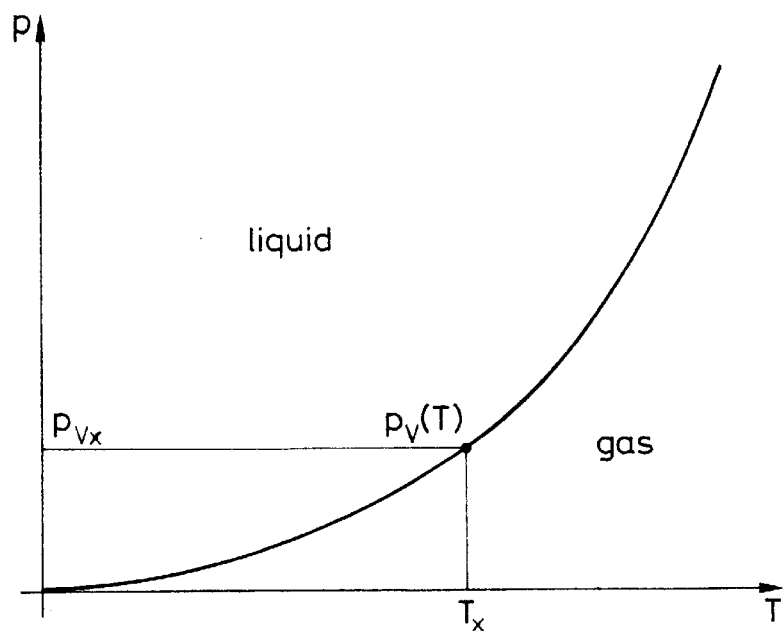

United States Patent
Lehmann

[11] Patent Number: 5,907,093
[45] Date of Patent: May 25, 1999

[54] METHOD FOR LEAK TESTING AND LEAK TESTING APPARATUS

[75] Inventor: Martin Lehmann, Obere Farnbuhlstrasse 1, CH-5610 Wohlen, Switzerland

[73] Assignee: Martin Lehmann, Switzerland

[21] Appl. No.: 08/862,993

[22] Filed: May 27, 1997

[51] Int. Cl.⁶ ................................................. G01M 3/32
[52] U.S. Cl. ............................................................ 73/49.3
[58] Field of Search .................... 73/49.3, 49.2 R, 73/49.2 T, 52

[56] References Cited

U.S. PATENT DOCUMENTS

| | | | |
|---|---|---|---|
| 857,388 | 6/1907 | Eno ........................................ | 73/49.2 R |
| 2,784,373 | 3/1957 | Lawrance et al. ......................... | 73/49.3 |
| 3,381,523 | 5/1968 | Nettles .................................. | 73/49.2 R |
| 4,320,653 | 3/1982 | Bernhardt . | |
| 4,409,817 | 10/1983 | Edwards, Jr. . | |
| 5,199,296 | 4/1993 | Lehmann ................................. | 73/49.3 |
| 5,239,859 | 8/1993 | Lehmann ............................... | 73/49.3 X |
| 5,482,683 | 1/1996 | Vipul et al. . | |
| 5,513,516 | 5/1996 | Stauffer ................................ | 73/49.3 X |
| 5,575,265 | 11/1996 | Kurihara et al. . | |

FOREIGN PATENT DOCUMENTS 9405991  3/1994  WIPO .

OTHER PUBLICATIONS

Patent Abstracts of Japan, vol. 011. No. 252 (P–605), Aug. 15, 1997, and JP62 056831A (Shinkosumosu Denki KK, Mar. 12, 1987 *abstract*.

Patents Abstracts of Japan vol. 012, No. 081 (M–676), Mar. 15, 1998 and JP62 220774A (Agency of Ind. Science and Technol), Sep. 28, 1987 *abstract*.

Patent Abstracts of Japan vol. 095, No. 006, Jul. 31, 1995, and JP 07 072281A (Toshiba Corp.), Mar. 17, 1995, *abstract*.

*Primary Examiner*—Michael Brock
*Attorney, Agent, or Firm*—Antonelli, Terry, Stout & Kraus, LLP

[57] ABSTRACT

For leak testing closed containers (9) which are filled with a filling product containing at least one liquid component the container is introduced in a test cavity (1) which is evacuated at least down to vapour pressure of that liquid component. The pressure in the surrounding of the container (9) and thus within test cavity (1) is monitored. Monitoring is performed by a vacuum pressure sensor (7), whereas lowering pressure surrounding the container (9) is performed by a vacuum pump (5). Leakage is detected by monitoring a pressure change in the surrounding of the container which is due to evaporation of liquid emerging from a leak and being evaporated in the low pressure surrounding.

40 Claims, 4 Drawing Sheets

METHOD FOR LEAK TESTING AND LEAK TESTING APPARATUS

FIELD OF INVENTION

The present invention is generically directed on a technique for leak testing closed and filled containers, whereby the filling material comprises at least one liquid component.

BACKGROUND

Leak testing techniques according to which closed containers are introduced in a test cavity which, after having sealingly been closed, is lowered in pressure by a suctioning pump are known. If the container is not leaking, then once a predetermined pressure has been reached in the test cavity and thus in the surrounding of a container to be tested, this pressure will be kept substantially constant. If a leak is provided in an area of the container, wherein air is entrapped, a flow of air out of the container will lead to a rise of the surrounding pressure. If a leak is present in the area of the container where filling good is entrapped, the question whether such leak will filling good is entrapped, the question whether such leak will lead to a significant rise of the surrounding pressure is largely dependent on the kind of filling good as of its viscosity, whether solid particles are present in the filling good and, obviously, on the largeness of the leak.

Different approaches have become known to accurately detect leaks at such product-filled containers, irrespective whether the leak is present in an air entrapping container area or in a container area covered with filling good. One such approach which is the topic of the yet unpublished co-pending European patent application No. 97107520.5 (enclosed as Appendix A) proposes to provide an impedance measurement, specifically a resistance measurement, just adjacent to the outer wall of the container by means of an electrode arrangement: As soon as liquid emerges from a leak it will contact a respective pair of impedance measuring electrodes and lead to a significant change of impedance measured between such electrodes.

Nevertheless, such an approach necessitates considerable additional expenditure with respect to provision of the impedance measuring arrangement in each test cavity, especially of a multi-cavity in-line inspection machine and does not enable detection of very small leaks far below of one micron and largely independent from container shape and kind of filling good.

OBJECT OF THE INVENTION

It is a primary object of the present invention to provide a leakage test method and apparatus, which may be applied to a very large scale of different containers and of different filling goods, provided at least one component thereof being liquid.

It is a further object of the present invention to provide such method and apparatus which are rather inexpensive with respect to electronic and further equipment, and which thus allow for very economic testing.

It is still further an object of the present invention to provide such method and apparatus which have a short measuring cycle and nevertheless a very high measuring accuracy.

SUMMARY OF THE INVENTION

These objects are realised by the testing method for leak testing at least one closed and filled container, whereby the content of the container comprises at least one liquid component and wherein a pressure difference is applied across at least a part of the wall of the container which part is to be leak tested and wherein the applied pressure difference is directed towards the surrounding of the container and wherein further the pressure in the surrounding of the container is monitored as a leak indicative signal which is characterised by the fact that the pressure difference is established by lowering the pressure in the surrounding of the container at least to a value which accords to the vapour pressure of the at least one liquid component of the filling product of the container to be tested.

The present invention departs from the recognition that if a container is leaking and liquid is drawn by the lower surrounding pressure to its outside this will—at a constant volume of the surrounding—lead to evaporation of the liquid as soon as the surrounding pressure reaches its vapour pressure. This leads to a significant change in surrounding pressure compared with the surrounding pressure which would establish at the same measuring conditions but with an unleaking container.

Monitoring the pressure in a test cavity containing the container, once vapour pressure of the possibly leaking liquid is reached reveals as being a very accurate technique for leak testing. It has been noted that by such a technique leak detection of containers with a very large spectrum of filling products may accurately be performed and that leaks at present moment down to 0.02 $\mu$m are accurately detectable.

Further, it has been noted that the volume of the test cavity is uncritical, so that by the inventive technique it becomes possible to simultaneously test batches of containers, thereby accurately detecting if one of such container batch is leaking.

As soon as the pressure surrounding a leaking container is lowered with respect to its interior pressure, some of the liquid is suctioned out of the container and as soon as the surrounding pressure reaches vapour pressure it starts to evaporate. As at a constant volume of the surrounding area of the container evaporation of the liquid leads to increase of pressure and the pump lowering the surrounding pressure must now remove vapour of the liquid too, significant measurements may be done from especially after the surrounding pressure of the container becomes lower than the same vapour pressure. Nevertheless, it is preferred to provide pumping abilities which may evacuate the surrounding of the container to be tested to a significantly lower value than said vapour pressure, namely by at least two, preferably even by at least three decades.

As a leak-significant pressure change may be detected as soon as one of possibly several liquid components of the filling good starts to evaporate—in the case the content of the container contains more than one liquid component—it is recommended to select the vapour pressure of that component of the several liquid components which is the higher and to lower the pressure of the surrounding of the container at least to that vapour pressure value.

Although and as well known vapour pressure is a function of temperature and thus it might be advantageous in some cases e.g. to heat the surrounding of the container to a predetermined temperature so as to settle the relevant vapour pressure for a predetermined liquid, the inventive method and apparatus becomes significantly less complex if the test is performed at room temperature, and thus the vapour pressure to be at least reached is considered at room temperature, i.e. around 20° C.

Further, a very accurate leak detection becomes possible if the surrounding pressure of the container is measured at two subsequent points in time, whereby we understand under "point" that interval of time necessary for accurately measuring the prevailing pressure. Although it is absolutely possible to realise leak detection by applying the pumping action of the evacuating pump to the surrounding of the container and then by measuring the resulting surrounding absolute pressure after a predetermined time span, the said measuring of the surrounding pressure at two specific points in time allows to use the first value measured as a reference value and then to form the difference of the second value measured with respect to the reference value. There is thereby realised a pressure difference measurement instead of an absolute pressure measurement. More specifically, the first pressure signal which is measured at the first point in time is stored as an electric signal, then, after having measured the second pressure value, a difference is formed between the first value (still stored) and the second value.

The PCT patent application No. WO94/05991 with its US counterpart No. U.S. Pat. No. 5,239,859, assigned to the same applicant as the present invention, describes a method and apparatus for very accurately offset-compensated pressure difference measurement. In a preferred mode of operating the method according to the present invention as well as of realising the inventive apparatus, that pressure difference measuring technique and apparatus are used. Therefore, the WO94/05991 or the respective U.S. Pat. No. 5,239,859 are fully incorporated by reference in this present disclosure, although, and as will be seen most important features are specifically described also in this present application.

Because it is largely uncritical how big the surrounding volume of a test cavity for the container is, with respect to the volume of the container to be tested, the inventive method and apparatus reveals to have a further significant advantage:

If the wall of the at least one container to be tested withstands the pressure difference between container internal pressure (normally ambient pressure) and lowered surrounding pressure, such a container may simply be introduced in the test cavity forming the surrounding, largely irrespective how big such container is with respect to the test cavity. Nevertheless, a highly accurate indication of leakage will inventively be gained. Therefore, one and the same test cavity may be used for a large number of differently sized and different-volume containers. This results in a further advantage in that batches of more than one, even of a multitude of containers, may be introduced in one test cavity forming the surrounding and although one single container occupying only a small percentage of the overall cavity volume, an accurate leak indication will be detected if even only one of the batch-containers is leaking into the surrounding atmosphere.

A further significant advantage of the present invention is the following:

Sometimes the filled containers are not completely filled, but there is some amount of air entrapped in the closed container. If a leak is present in that area of such a container, which is adjacent to entrapped air or gas, by lowering the surrounding pressure, such air will be suctioned through the leak out of the container. With the pressure of the entrapped air in the container becoming progressively lower, there will also start vaporisation of the liquid component within the container and such vapour will also leave through the leak. Both, namely first the air leaving through the leak, then vapour leaving through the leak, will enlarge the surrounding pressure so that a leak in an entrapped air region of the container will lead to a change in the surrounding pressure, i.e. to rising of said pressure, as if the leak was in the liquid content covered area of the container wall. Thus, by properly setting a threshold value for leak detection according to the smallest still tolerated pressure change in the surrounding, it becomes uncritical whether such leak is present at an air-covered container area or at a content-covered container area.

If one and the same leak at an air-entrapped area of the container leads to a smaller pressure change in the surrounding, than the same leak would generate if situated at a liquid-covered container area, it is such a pressure change which will govern setting of a threshold value to detect whether a container is leaky or not. If, inversely, one and the same leak in a liquid-covered area would result in a smaller pressure change in the surrounding than such leak in an air-contacted wall area, then it is again that smaller pressure change which governs the threshold setting for detecting containers.

If a container under test is largely leaky, lowering of the surrounding pressure should be stopped as soon as such leaking is detected so as to prevent the content of the container to spoil the interior of the test cavity or, generally spoken, the surrounding of the container more than absolutely necessary.

This is realised either by monitoring whether the pumping action results in a predetermined lowering of surrounding pressure or not or one may detect spreading of content of the container into its surrounding by means of an impedance, thereby preferably a DC resistance measurement in the surrounding of the container just adjacent to the wall of the container which is to be tested. This is realised by providing an electrode arrangement in said adjacent surrounding and all around at least that part of the container to be tested. As soon as filling content of the container is suctioned to its outer wall, the electrode arrangement will be bridged by such content, leading abruptly to an indicative impedance change which, after having been detected, is used to stop further pressure lowering at the surrounding of the container.

This latter technique of rapidly detecting large leaks is applied especially to containers where it is necessary to snugly encapsulate them in the test cavity because their walls would not stand the pressure difference applied. In such a case the electrode arrangement for impedance measurement may be incorporated along the inner wall of the test cavity, which snugly fits with the at least one container. If such container is to be tested and therefore the test cavity snugly fits its shape, nevertheless a continuous volume is maintained between the outer wall of the container and the wall of the test cavity for defining the surrounding of the container by providing a sustaining grid or mesh inlay or preferably by roughening the interior wall of the test cavity so that a multitude of micro-embossments of the test cavity wall sustain the container wall and prevent it from further outward bowing due to the applied pressure difference. Thereby, the intercommunicating space between such embossments defines for the surrounding space of the container.

Once the container in a test cavity, defining for its surrounding, has been detected as being leaky, it is probable that such test cavity will be contaminated by some of the container's content. Then, such cavity is cleaned after the leaky container has been removed, be it by evacuation and/or flushing with a flushing gas, preferably nitrogen, be it by heating or by combining these techniques.

If the inventive method or apparatus is applied for in-line testing containers and thus two or more of the inventive methods and of the respective apparatus are operated in parallel on a set of containers and one of such containers is detected to be leaky, then the respective test cavity defining for its surrounding is not anymore filled with a container at the next measuring cycle, but is kept empty, using that cycle during which the other cavities are in testing condition for cleaning and conditioning the probably contaminated cavity. Further, it is proposed in some cases to accelerate squeezing-out of liquid, if a leak is present, by mechanically biasing the wall of the container inwardly, thus rising its interior pressure.

To fulfil the object, the present invention proposes a leak testing apparatus for leak testing at least one closed and filled container, whereby the content of the container comprises at least one liquid component, which comprises at least one sealingly closable test cavity and at least one evacuation pump operationally connected to the test cavity and further at least one pressure sensor operationally connected to the test cavity, whereby and inventively the evacuation pump is selected so as to be able to pump the test cavity to at least vapour pressure of the liquid component of the container content, approx. at room temperature and the pressure sensor is a vacuum pressure sensor, preferably comprising at least a Pirani sensor stage.

Preferred embodiments of the inventive method and inventive apparatus and preferred uses thereof are disclosed hereinafter. Thereby, it must be pointed out that besides of leak testing of smaller containers, the present invention makes it possible to permanently monitor tightness of high tank plants, as for gasoline, gases etc., e.g. on train or street transports, thereby generating an alarm signal as soon as a leak is detected.

SHORT DESCRIPTION OF THE FIGURES

Figure 2:
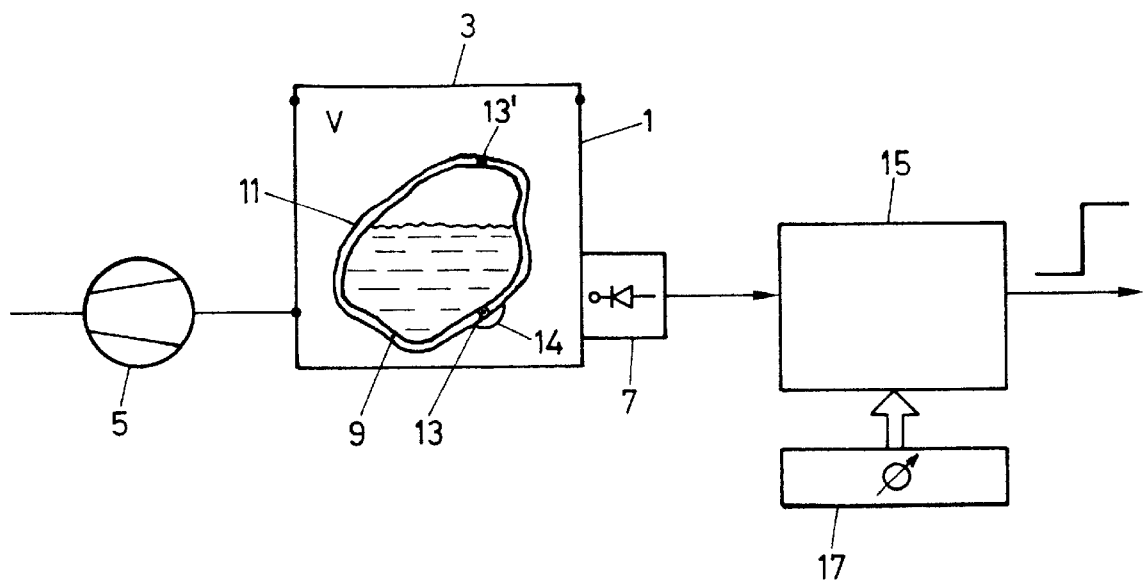
Figure 3:
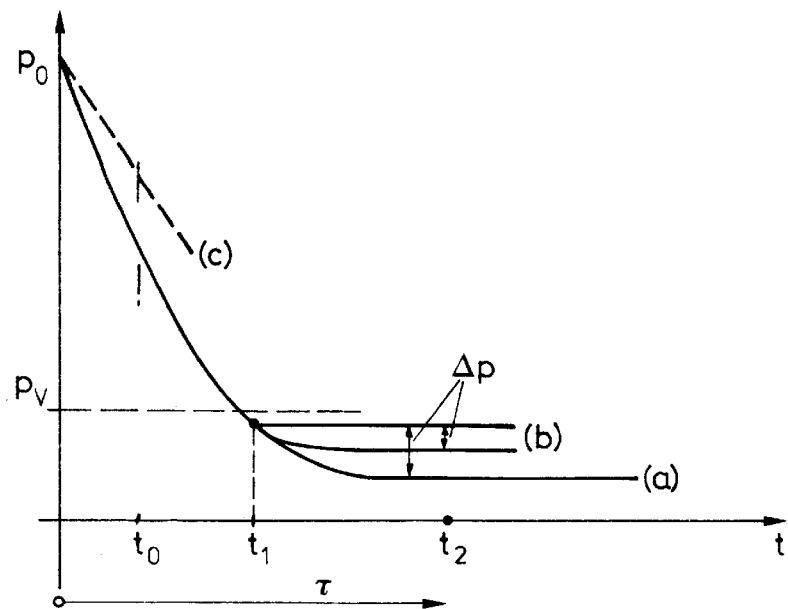
Figure 4:
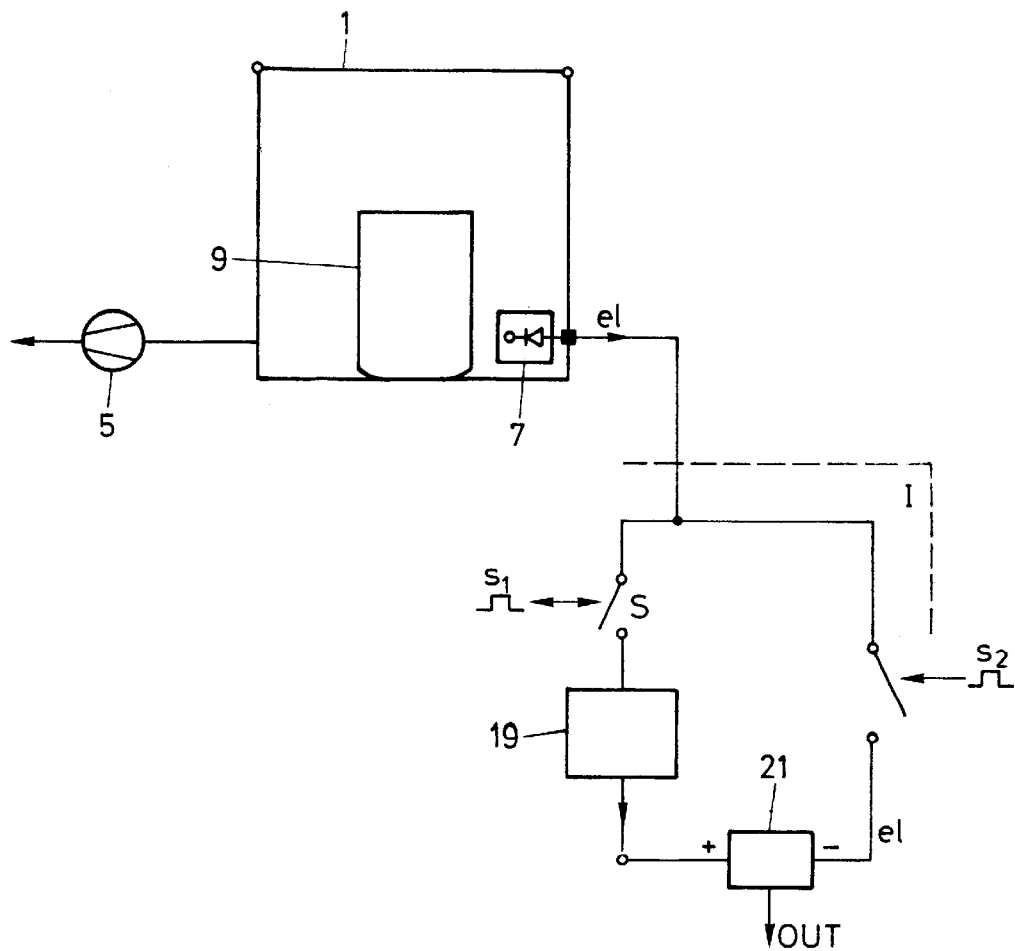
Figure 5:
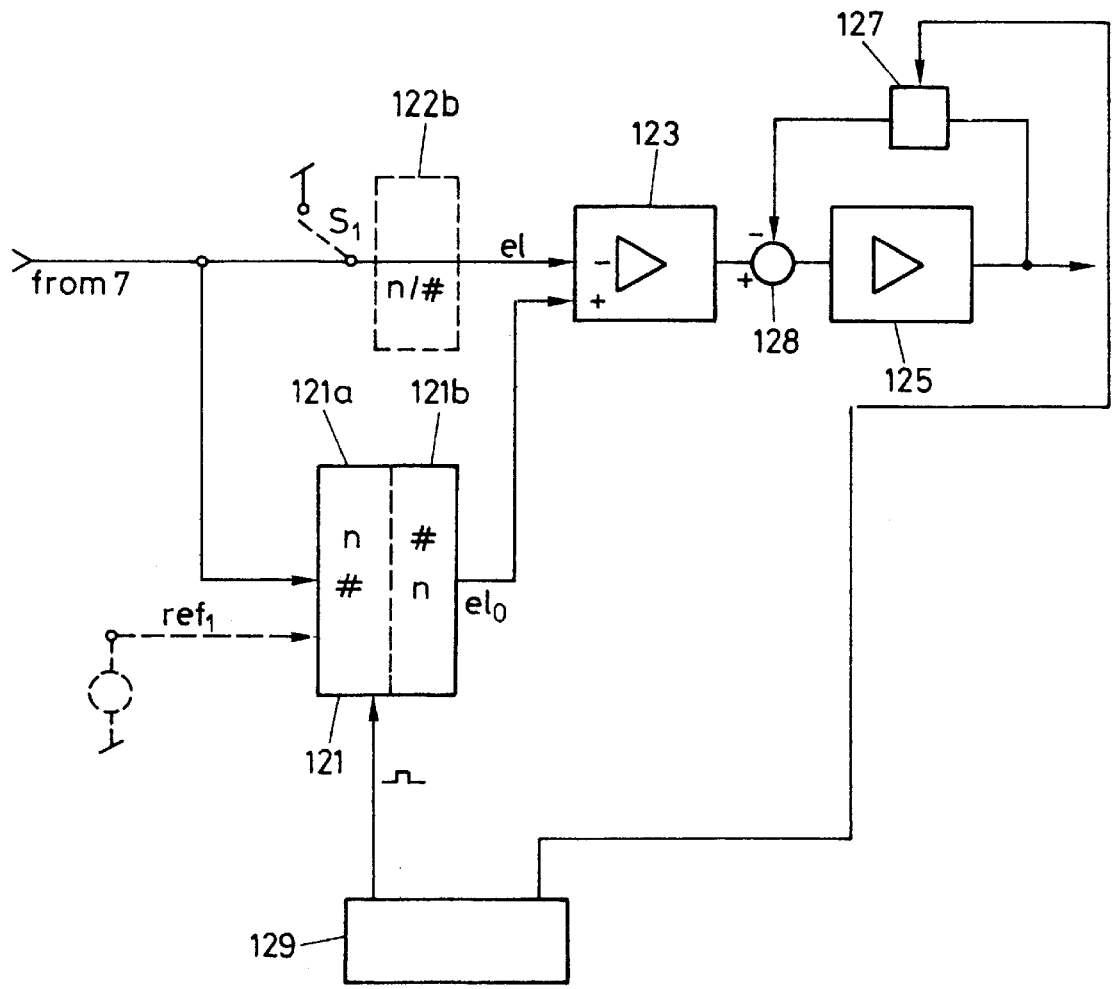
Figure 6:
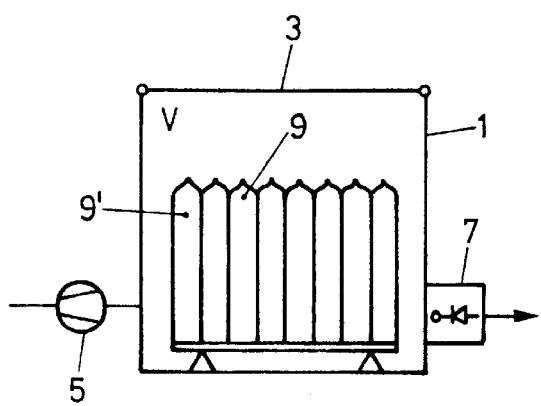
Figure 7:
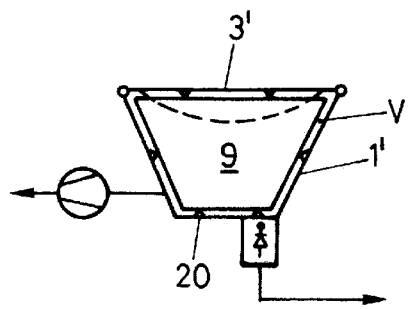
Figure 8:
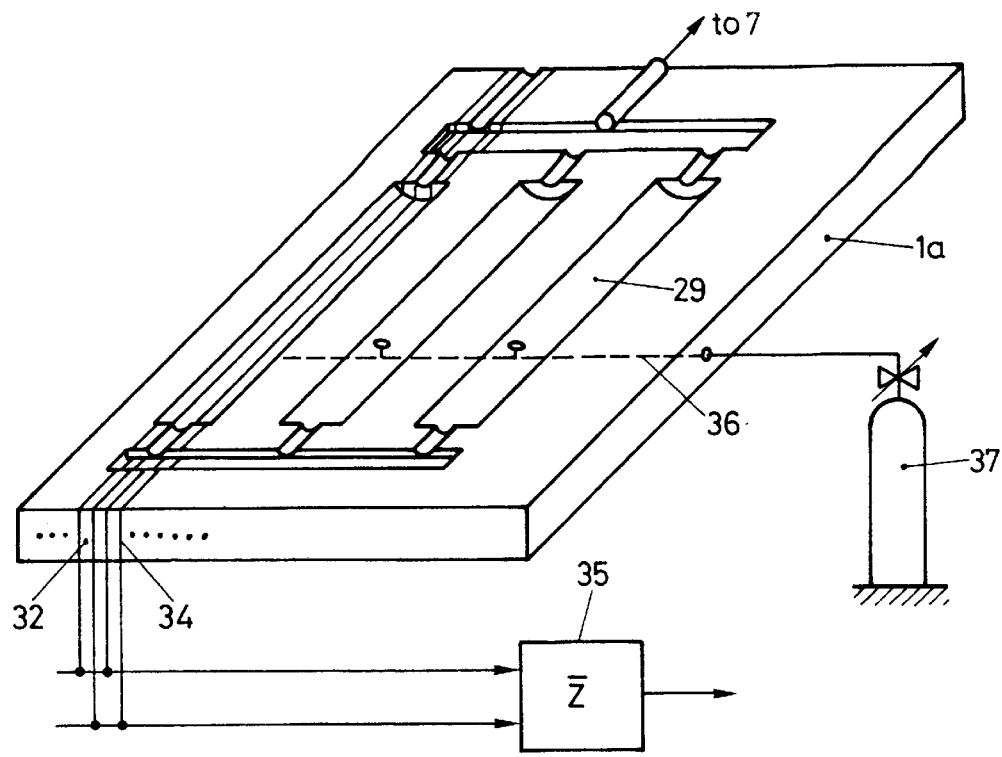
Figure 9:
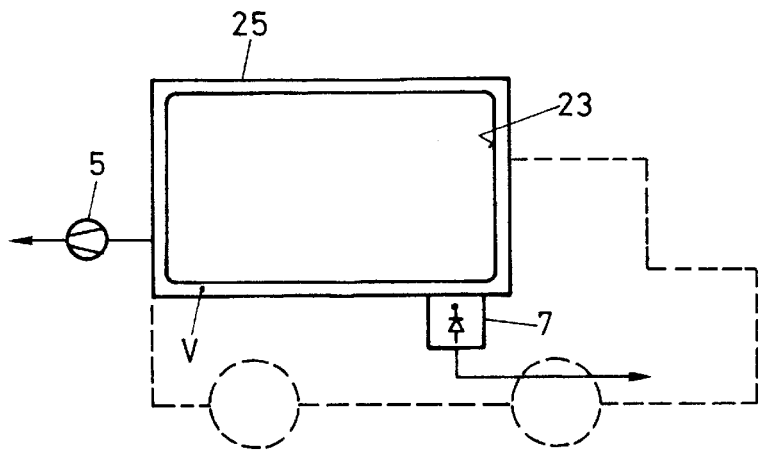
Figure 10:
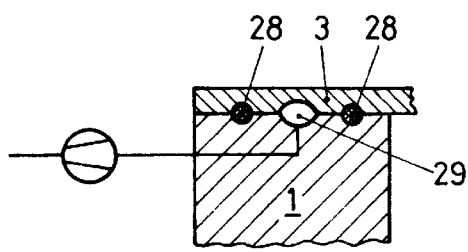

The present invention will now additionally be described with the help of figures showing specific and today preferred examples of realising the present invention. Such figures show:

FIG. 1: qualitatively the dependency of vapour pressure from temperature of a liquid;

FIG. 2: schematically an inventive test apparatus operating according to the inventive method;

FIG 3: qualitatively the time course of the pressure of the surrounding of a container to be inventively tested for explaining the inventive method and apparatus operation;

FIG. 4: in a functional block diagram a preferred form of realisation of an inventively operated inventive test apparatus;

FIG. 5: as a functional block diagram a preferred form of realisation of the evaluating electronic at an inventive apparatus performing the inventive method;

FIG. 6: schematically batch operation of an inventive apparatus;

FIG. 7: schematically a test cavity for testing flexible wall containers;

FIG. 8: in a perspective view one half of a test cavity for inventively testing three containers as a batch;

FIG. 9: schematically a double-wall tank directly used to perform the inventive method with an inventive apparatus so as to survey tank leakage;

FIG. 10: schematically a preferred sealing at a test cavity of the inventive apparatus.

In FIG. 1 there is qualitatively shown the course of vapour pressure $p_v(T)$ in the pressure versus temperature diagram.

At a predetermined temperature $T_x$ a liquid starts to evaporate when the respective vapour pressure $p_{vx}$ is reached. Above the vapour pressure course the material is liquid, below the material is gaseous.

According to FIG. 2 an inventive apparatus comprises a test cavity 1 with a sealingly closable cover 3. A vacuum pump 5 connected to the test cavity 1 which may be a drag pump or a rotational piston valve pump or a diffusion pump or a turbo vacuum pump as a turbo molecular pump. This depends on the degree of vacuum which shall be established within cavity 1. Further, there is provided a vacuum pressure sensor 7 as e.g. a Pirani sensor, which measures the pressure prevailing in the test cavity 1. At least one closed container 9, which is filled at least to some extent with a filling product containing at least one liquid component is introduced through opened cover 3 into the test cavity 1 which is then sealingly closed. By starting operation of vacuum pump 5 the surrounding of container 9 and thus the intermediate volume V of test cavity and container 9 is lowered.

According to FIG. 3 starting at ambient pressure $p_o$ the pressure in volume V is lowered at least down to the value $p_v$ which accords to the vapour pressure of the liquid component within the filling good of the container 9. It is advisable to select a vacuum pump 5 which enables to evacuate the test cavity 1 down to a pressure which is at least one, preferably two and even more preferred three decades $(10^2)$/orders of magnitude lower than the vapour pressure $p_v$ of the liquid content of the filling product.

The test is preferably performed at room temperature, i.e. at a temperature T of about 20° C. If the liquid content is water then the vapour pressure $p_v$ of water at room temperature is about 20 mbar and it then is preferred to provide an evacuation pump 5 which is able to evacuate the test cavity to about $10^{-2}$ mbar.

If the container provided in the test cavity 1 having a relatively rigid wall 11 is not leaky, then qualitatively the pressure in volume V will follow the course (a) according to FIG. 3 down to the more or less constant value of pressure, which may be reached by that type of vacuum pump installed. If, one the other hand, the container 9 is leaky as schematically shown in FIG. 2 e.g. at location 13, then a small amount 14 of liquid component of the filling good will be drawn through the leak 13 out of the container 9 and as soon as the pressure prevailing in the volume V becomes $p_v$, starts to evaporate into the volume V. As qualitatively shown in FIG. 3 this leads to a pressure versus time course according to (b), i.e. evaporation of the liquid leads to a pressure rise in volume V, counteracting the action of the vacuum pump 5. The vacuum pump 5 will have to remove additionally the vapour to finally achieve a vacuum level according to course (a). If the leak is situated at an area of the container 9 where air is entrapped, as in FIG. 2 at 13', then evacuation of volume V will first lead to suctioning air out of the container, again counteracting the operation of vacuum pump 5, then the liquid content within container 9 will start to evaporate within the container and vapour will be suctioned out of leak 13'. This, too, will lead to a pressure rise in volume V, counteracting the pressure course which would be followed if just air had to be removed by vacuum pump 5.

By means of the vacuum sensor 7 the course of pressure in the volume V is monitored. Experiments have shown that largely independent of the amount of volume V in a test cavity a significant difference of pressure according to the courses (a) and (b) of FIG. 3 is reached after a time span τ of a few seconds (one to three seconds) and at a leak smaller than 1 micron (0.02 $\mu$m), the pressure difference between a leaky and an unleaky container being of about one pressure decade. Measurements were performed with water as liquid content.

Although it is absolutely possible to measure the absolute pressure in volume V, e.g. after the time span $\tau$ to detect leakage of the container a pressure difference measurement is preferred, as will be explained with the help of FIG. 4.

Back to FIG. 2 the pressure sensor 7 is operationally connected to an evaluating unit 15, whereat especially leak indicative threshold values are preset, as schematically shown by means of a presetting unit 17. The output of the evaluation unit 15 is a two-state signal indicating leaky or not leaky.

According to FIG. 4 the output of the vacuum sensor 7 is input to a storage unit 19, controlled by a timing control signal $s_1$, as schematically shown via switch S. According to FIG. 3 this is performed at a first point in time $t_1$. At a second point in time, according to FIG. 3 $t_2$, the output of the storage unit 19 and the output of the sensor 7 are connected to respective inputs of a difference forming unit 21, which generates an output signal which accords with the pressure difference $\Delta p$ of FIG. 3.

A further, most preferred realisation of the evaluation electronic is shown in FIG. 5. The output signal of sensor 7 is input to a conversion unit 121, which comprises, as an input stage, an analogue to digital converter 121$a$, followed by a digital to analogue converter 121$b$. The output of the converter stage 121 is fed to a difference amplifier unit 123, which additionally receives directly the output signal from sensor 7. The output of the difference amplifier unit 123, according to the difference unit 21 of FIG. 4, acts on a further amplifier unit 125, the output of which being superimposed at 128 to a signal from storage unit 127. The input of the storage unit 127 is fed from the output of unit 125. A timer unit 129 time controls the arrangement. For storing a first pressure value from sensor 7, according to FIG. 3 at time t1, the timer unit 129 enables a conversion cycle at unit 121, so that a reconverted analogue output signal $el_o$ appears at the output. Simultaneouly, the substantially same signal from sensor 7 is applied as signal el to the second input of unit 123. Thus, at the output of unit 125, a zero signal should appear. Nevertheless, in general a zero-offset signal will appear at the output of unit 125, which signal is stored in the storing unit 127, enabled by the timing unit 129. At time t2 no conversion is triggered at the unit 121, so that there appears at the input of amplifier 123 directly from sensor 7 the pressure value prevailing at $t_2$ and, from stage 121, the stored pressure value which was prevailing at $t_1$. Further, the zero offset signal which was stored in unit 127 is superimposed as a offset-compensating signal so that the resulting signal at the output of amplifier unit 125 is zero-offset compensated.

This allows a very accurate measurement of pressure difference $\Delta p$ according to FIG. 3.

If the container under test has a large leak, then, and according to FIG. 3 course (c) the pressure prevailing in the volume V of the test cavity 1 will have just from the beginning of operating the vacuum pump 5 a different course. This may easily be detected, e.g. by comparing at a previous point in time $t_0$ the output signal of sensor 7 with a predetermined threshold value (not shown), and if such threshold value is not reached by the actual pressure, the effect of the vacuum pump 5 on test cavity 1 is disabled. This to avoid that, with a larger leak, a huge amount of content of the container is suctioned into the test cavity and contaminates that cavity.

As was mentioned, the proposed method accurately functions largely independently from the volume V between test cavity 1 and the at least one container to be tested. This allows, according to FIG. 6, to simultaneously test batches 9' of containers 9, thereby maintaining accuracy of detecting whether one or more than one of the containers 9 leak. Further, the fact that detection accuracy is not critical with respect to difference volume V leads to the possibility of providing one test cavity 1 for a multitude of differently shaped and different-volume containers 9 to be tested therein.

If the wall of a container to be tested may not mechanically withstand the pressure loading of approx. 1 bar, then, and as schematically shown in FIG. 7, a test cavity 1' with cover 3' is provided which snugly fits with the shape of the container 9. Thereby, protrusions 20, as schematically shown in FIG. 7, prevent that by effect of the evacuation the walls of the container are firmly suctioned on to the inner wall of the test cavity and thus make sure that there remains a volume V between container and test cavity wall for being evacuated according to the invention. Such protrusions 20 may be realised by a mesh or grid inlay or, and preferably, by mechanically roughening the inner wall of the cavity, so that micro-embossments sustain the wall of the container, thereby leaving a continuous interspace as volume V.

As shown in dashed line in FIG. 7 it might further be advantageous, e.g. when closing the cover 3 or 3' of the cavity, to mechanically bias a part of the container's wall inwardly, thereby increasing the inner pressure of the container 9 and additionally pressing liquid component of the filling product out of a leak if such a leak is existent.

According to FIG. 9 the method and apparatus according to the present invention may be used to monitor huge tanks with respect to leakage. In FIG. 9 there is shown a tank with double-wall, namely with an inner wall 23 and an outer wall 25. Testing tightness of both these walls is performed by using the intermediate volume of the two walls, as volume V according to FIG. 2. Such a technique may be applied e.g. for tanks on road or rail vehicles or for huge stationary tank plants, e.g. for gasoline.

In FIG. 8 there is shown one half 1$a$ of a test cavity 1 for applying the inventive method in an inventive apparatus on three containers at 29 as on small plastic containers for medical appliance. The containers may have flexible walls as the test cavity 1 snugly fits their shape. There is further shown another technique to rapidly detect whether one of the containers has a large leak. There are provided impedance measurement electrodes 32 and 34 integrated in the wall of the cavity 1 and mutually electrically isolated. They are connected to an impedance or, preferably, resistance measuring unit 35. If by applying a vacuum to the test cavity, preferably with a roughened interior wall, liquid filling content is suctioned to the outside of the container wall, this is quickly detected by an abrupt change of impedance measured between the electrodes 32 and 34. The output of the impedance measuring unit 35 disables (not shown) further evacuation of the test cavity 1.

Once a test cavity has been spoiled by outpouring filling good of a leaking container it is cleaned, either by cleaning evacuation and/or pouring with a gas, preferably with nitrogen, and/or by heating. In FIG. 8 there is shown a feeding line for a flushing or cleaning gas, controllably fed from a gas tank 37 to a contaminated test cavity 1, which gas preferably is nitrogen.

Two cavity halves, 1$a$ according to FIG. 8 are sealingly put one upon the other to complete a test cavity 1 according to FIG. 2.

If in-line testing of containers shall be performed, for which the present invention is especially suited due to its short measuring cycle, more than one, namely a set of several test cavities is provided, e.g. on a carousel, which are automatically loaded with containers to be tested (not shown) from a conveyor and which perform simultaneously the described testing technique. If one of the containers tested in such cavity is detected to be leaky, then the respective cavity is not reloaded with a further container afterwards, but this cavity is maintained empty during the measuring cycle on a next set of containers. Meanwhile, the cavity kept unloaded is cleaned, as was described, either by evacuation and/or gas flushing and/or heating.

Obviously, there must be realised a good vacuum-tight sealing between a cover 3 or 3' of the test cavity and the main body of the test cavity 1 or between the two halves 1a of test cavity according to FIG. 8. This is realised preferably by providing at least a pair of parallel seals 28 as of concentric O seals and by separately pumping an intermediate space 29 between such seals, as shown in FIG. 10. If the container to be tested contains a filling product with more than one specific liquid component, the vapour pressure of that component is selected for leak detection which has the highest vapour pressure, i.e. which component starts to evaporate at relatively highest pressure. Thereby, viscosity has to be considered too, i.e. a component is to be selected for defining the vapour pressure, which component is liquid enough to penetrate smallest leaks. By evacuating the test cavity down to a pressure which is significantly lower than the vapour pressure of any liquid component it becomes uncritical which vapour pressure valve is to be considered.

I claim:

1. A method for leak testing at least one closed and filled container, whereby the content of said container comprises at least one liquid component, comprising the steps of:
    applying a pressure difference across at least a part of the wall of the container which part is to be tested by evacuating the surrounding of said container by means of a pumping arrangement;
    lowering said pressure in said surrounding to a value at least according to vapour pressure of said at least one liquid component;
    monitoring the pressure in said surrounding as a leak indicative signal, thereby performing evacuation of said surrounding by said pumping arrangement at least substantially up to monitoring said pressure as a leak indicative signal.

2. The method of claim 1, wherein said pressure in said surrounding is lowered towards a pressure value which is lower than said vapour pressure by a factor of at least two decades ($10^2$).

3. The method of one of claims 1 or 2, wherein more than one liquid component is present, and said vapour pressure is the higher vapour pressure of the vapour pressures of said at least two components.

4. The method of claim 1, wherein said test is performed at room temperature.

5. The method of claim 1, wherein said pressure monitored as said leak indicative signal is monitored after reaching said vapour pressure.

6. The method of claim 1, wherein said pressure monitored is sampled at a first point in time, resulting in a first pressure measuring signal and is sampled at a second, subsequent point in time, resulting in a second pressure measuring signal and that a pressure difference formed by said two pressure measuring signals is evaluated as leak indicative signal.

7. The method of claim 6, wherein the step of generating said first and second measuring signals as electrical signals, and storing said first signal at least up to said second point in time.

8. The method of claim 6 or 7, including the step of providing a pressure measuring sensor in said surrounding and operationally connecting said sensor to both inputs of a difference forming unit at said first point in time, generating a zero offset signal dependent from the output signal of said difference forming unit, storing said zero offset signal and compensating zero-offset at said signal difference of said two measuring signals by said stored zero offset signal.

9. The method of claim 6, including the step of providing a pressure measuring sensor in said surrounding and comparing the output signal of said sensor with one or more than one predetermined signal values.

10. The method of claim 6, including the step of storing said first measuring signal by means of an analogue to digital converter, enable for conversion at said first point in time.

11. The method of claim 10, including the step of reconverting the digital output signal of said analogue to digital converter into an analogue signal.

12. The method of claim 1, further comprising the step of simultaneously testing a batch of said containers as one container.

13. The method of claim 1, further comprising the step of performing an impedance measurement at or at least adjacent to said part of said wall in said surrounding wherein said impedance measurement is a resistance measurement with DC and enabling or disabling further lowering of said pressure in said surrounding by the result of said impedance measurement.

14. The method of claim 1 including the step of providing a test cavity with a test chamber snugly fitting the outer shape of said at least one container, thereby maintaining at least at said part a residual volume to be lowered in pressure and between said part and the wall of said test cavity.

15. The method of claim 1, including the step of providing a test cavity for said at least one container, said test cavity defining for a test chamber significantly larger than the volume of said container.

16. The method of claim 1, including the step of providing a test cavity for said container and cleaning at least said test cavity after a container therein has been detected as leaking, said cleaning being performed by evacuating said cavity and/or by flushing with a gas, preferably by nitrogen and/or by heating.

17. The method of claim 1, including the step of in-line testing a series of said containers in a set of test cavities and further comprising the step of disabling testing in a test cavity for at least one testing cycle if the container previously tested therein has turned out to be leaky.

18. The method of claim 1, further comprising the step of increasing internal pressure of said at least one container by mechanically biasing at least a part of its wall inwardly.

19. The method of claim 1, for at least one container, wherein said one component is water, characterised by the step of evacuating said surrounding to less than 20 mbar, preferably to approx. $10^{-2}$ mbar.

20. The method according to claim 1, wherein said pressure in said surrounding is lowered towards a pressure value which is lower than said vapour pressure by a factor of at least three decades ($10^3$).

21. A leak testing apparatus for leak testing at least one closed and filled container, whereby the content of the container comprises at least one liquid component and comprising:

at least one sealingly closable test cavity;

at least one evacuation pump operationally connected to said test cavity;

at least one pressure sensor operationally connected to said test cavity;

said evacuation pump being selected so as to enable pumping of said test cavity down to at least vapour pressure of said component approx. at room temperature and said pressure sensor being a vacuum pressure sensor;

a timing unit enabling said evacuation pump to operate up to generating a pressure value in said test cavity as low as at least vapour pressure of said component and up to generating by said pressure sensor a leak indicative signal.

22. The apparatus of claim 21, wherein said evacuation pump is at least one of a drag vacuum pump, a piston valve vacuum pump, a diffusion pump, a turbo vacuum pump.

23. The apparatus according to claim 21, wherein said sensor comprises a Pirani sensor.

24. The apparatus of claim 21, wherein said timing unit operationally connects the output of said sensor to an output of said apparatus generating a leak indicative signal, once pressure within said test cavity has reached at least said vapour pressure value.

25. The apparatus according to claim 21, said evacuation pump being selected so as to be able to pump said test cavity down to a pressure at least smaller than said vapour pressure by a factor of one decades (10).

26. The apparatus of claim 21, further comprising a storage unit operationally connected to the output of said sensor and a difference forming unit, one input thereof being operationally connected to the output of said storage unit, the second input thereof being operationally connected to the output of said sensor, a timing unit operationally connecting the output of said sensor at a first point in time to the input of said storage unit and operationally connecting at a second point in time the output of said storage unit to said one input of said difference forming unit and the output of said sensor to said other input of said difference forming unit.

27. The apparatus of claim 26, wherein said timing unit enabling said operational connection of said output of said sensor to said storage unit after said sensor has detected a pressure within said test cavity reaching said vapour pressure.

28. The apparatus of claim 26 or 27, wherein said storage unit comprising an analogue to digital converter, said timing unit being operationally connected to the conversion control input of said analogue to digital converter.

29. The apparatus of claim 28, further comprising a digital to analogue converter operationally connected to the output of said analogue to digital converter, the output of said digital to analogue converter being operationally connected to said difference forming unit.

30. The apparatus of one of the claims 26 or 27, wherein said timing unit operationally connects at said first point in time the output of said sensor to both inputs of said difference forming unit and wherein a further storage unit is operationally connected to the output of said difference forming unit and is enabled at said first point in time, the output of said further storage unit being operationally connected with the output of said difference forming unit at said second point in time.

31. The apparatus of claim 21, wherein said test cavity has a shape snugly fitting said at least one container and comprising sustaining means at its inner wall to maintain a free space between the wall of said container and the wall of said test cavity once the volume therebetween is lowered.

32. The apparatus of claim 31, further comprising at least one pair of impedance measuring electrodes within said cavity, connected to an impedance measuring unit, preferably to a resistance measuring unit, the output thereof switchingly enabling and disabling further evacuation of said test cavity by means of said evacuation pump.

33. The apparatus of claim 21, wherein said test cavity being large enough to receive at least two, preferably a multi-container batch of said containers.

34. The apparatus of claim 21, wherein said test cavity being significantly larger than said container and thus being apt to flexibly receive differently shaped and different volume containers.

35. The apparatus of claim 21, wherein said cavity comprising a removable cover and at least a pair of seals around the opening opened by said cover, the space between said two seals being pumped.

36. The apparatus of claim 21 for in-line testing a multitude of containers, said apparatus further comprising a set of said test cavities to which a respective number of containers is fed for testing, and control means to prevent a test cavity being filled with at least one container to be tested once the container previously tested in said one test cavity has been detected as leaking.

37. The apparatus of claim 21, further comprising at least one cleaning gas line abutting into said cavity and being connected to a cleaning gas tank, preferably containing nitrogen.

38. The apparatus according to claim 21, comprising a multitude of test cavities, arranged on a carrousel for in-line leak testing containers.

39. The apparatus according to claim 21, wherein said at least one container is selected form the group consisting of blisters, vials, medical application containers, foodstuff or beverage containers, tanks.

40. The apparatus according to claim 21, wherein said at least one container is a tank of a tank plant which is tested for leakage by said apparatus.

* * * * *